United States Patent
Raimbault et al.

(10) Patent No.: US 7,225,061 B2
(45) Date of Patent: May 29, 2007

(54) METHOD AND DEVICE FOR DETECTING PILOT INDUCED OSCILLATIONS IN AN AIRCRAFT

(75) Inventors: Nathalie Raimbault, Toulouse (FR); Pierre Fabre, Toulouse (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/704,651

(22) Filed: Nov. 12, 2003

(65) Prior Publication Data
US 2004/0098176 A1 May 20, 2004

(30) Foreign Application Priority Data
Nov. 18, 2002 (FR) .................................. 02 14381

(51) Int. Cl.
G05D 1/00 (2006.01)
G06F 7/00 (2006.01)
B64C 13/04 (2006.01)

(52) U.S. Cl. ............................. 701/3; 701/11; 244/75.1

(58) Field of Classification Search .................... 701/3, 701/1, 7, 8, 11; 702/144; 244/75 R, 177, 244/190; 73/65.08, 1.78; 340/945
See application file for complete search history.

(56) References Cited

U.S. PATENT DOCUMENTS

| 4,298,833 | A | 11/1981 | Edwards et al. |
| 4,741,501 | A | 5/1988 | Clelford et al. |
| 5,136,518 | A | 8/1992 | Glover |
| 5,528,119 | A | 6/1996 | Rundqwist et al. |
| 5,935,177 | A | 8/1999 | Cox et al. |
| 6,375,127 | B1 * | 4/2002 | Appa .......................... 244/215 |
| 2005/0021193 | A1 * | 1/2005 | Raimbault et al. ............. 701/4 |

OTHER PUBLICATIONS

Preliminary Search Report dated Aug. 7, 2003.

* cited by examiner

Primary Examiner—Y. Beaulieu
(74) Attorney, Agent, or Firm—Stevens, Davis, Miller & Mosher, LLP

(57) ABSTRACT

A method and device for detecting pilot induced oscillations in an aircraft may detect signals having frequencies of between 0.3 Hz and 0.6 Hz within commands signals generated by a pilot for controlling an aerodynamic surface of the aircraft. The energy of the detected signals is analyzed to determine whether significant pilot induced oscillations are present within the command signals, and an indication of the degree of the oscillations is generated for use by the pilot.

10 Claims, 3 Drawing Sheets

METHOD AND DEVICE FOR DETECTING PILOT INDUCED OSCILLATIONS IN AN AIRCRAFT

Figure 1:
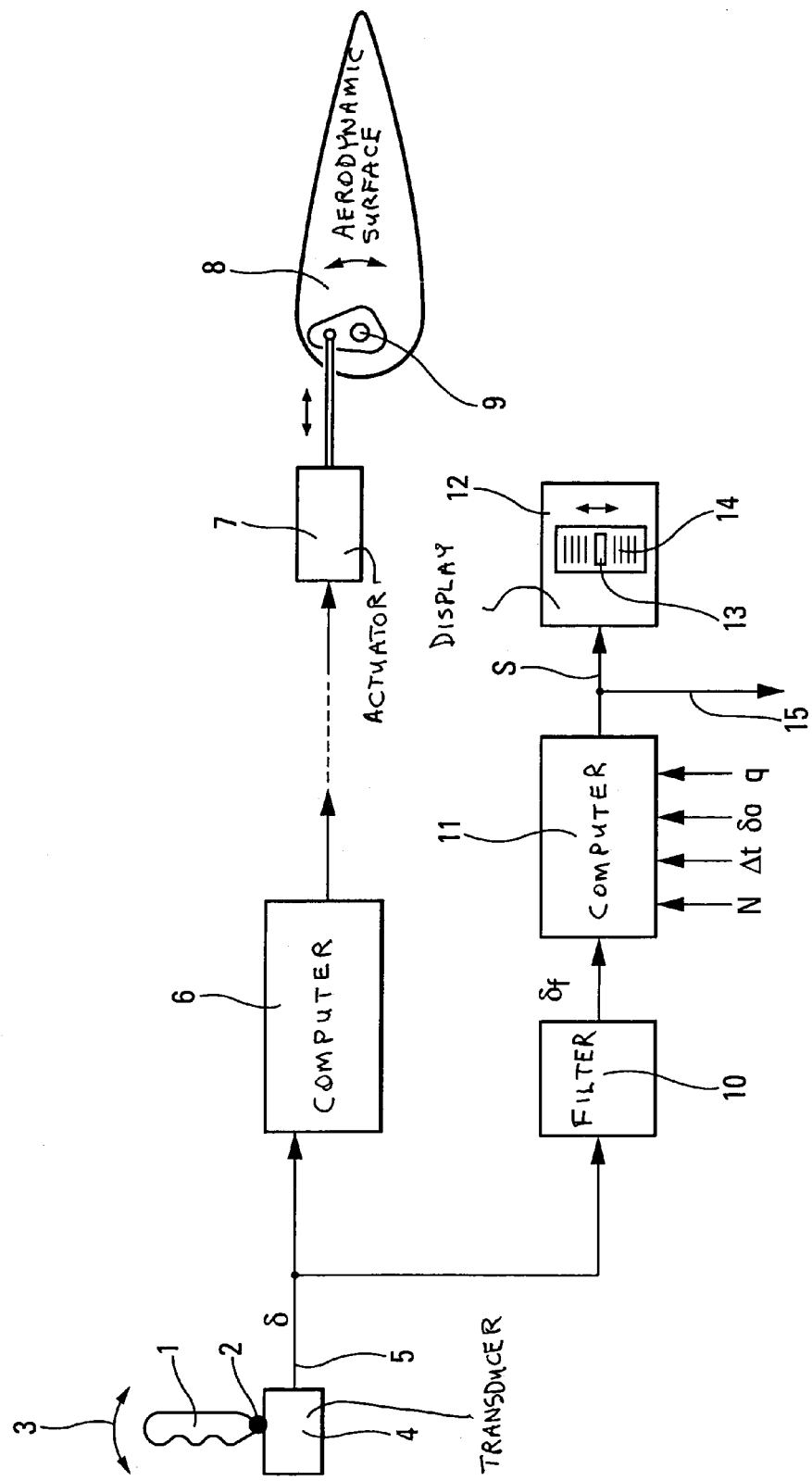

The present invention relates to a method and a device for detecting, in an electric command for flying an aircraft, oscillations corresponding to pilot induced oscillations.

It is known that the controls (sticks, rudder) of modern aircraft, particularly those known as ministicks, are easy for the pilot and/or the copilot of said aircraft to handle, it being possible for them to be tilted very quickly. By contrast, the actuators operating the moving aerodynamic surfaces of the aircraft (ailerons, flaps, rudders, etc.) operated from these controls cannot respond instantly to the electric commands generated by these controls. There may therefore, at large control amplitudes, be a significant phase shift between the movement of a control and the movement of the moving aerodynamic surfaces it controls.

As a result, the pilot, noticing that the position of the operated mobile aerodynamic surfaces is lagging behind the position chosen for said control member, may attempt to further increase the amplitude by which he tilts said control member. However, the amplitude of turning of the aerodynamic surfaces may then exceed that corresponding to the initial command, which means that the pilot then reduces the tilt of said control member, thus leading, with a delay, to a return of the aerodynamic surfaces, etc. Oscillations, caused by coupling and generally referred to in aeronautical parlance as "pilot induced oscillations" (PIO) therefore occur in the aircraft and may degrade the precision of the flying.

In an attempt at solving this problem, it is known practice to increase the size of the actuators of the aerodynamic surfaces controlled and of their electrical and hydraulic supplies, thus increasing the cost and mass of the aircraft. Such increases in cost and in mass may become intolerable in the case of large-sized aircraft.

Furthermore, document U.S. Pat. No. 4,298,833 envisions the processing of the command, particularly by filtering it, to convert it into an order that is free of pilot induced oscillations. However, this processing is performed without any true detection of the pilot induced oscillations and without the knowledge of the pilot, who may then continue to generate such oscillations.

The object of the present invention is to overcome these disadvantages. The invention relates to a simple method and a simple device for detecting pilot induced oscillations, so as to alert the pilot to their occurrence and/or take action to avoid their effect.

To this end, according to the invention, the method for detecting oscillations, corresponding to pilot induced oscillations, in an electric command $\delta$ controlling an aircraft about one of its axes of maneuver (roll, pitch or yaw), said electric command $\delta$ being able to adopt a maximum value $\delta o$, is notable in that:
- said electric command $\delta$ is sampled at a sampling interval $\Delta t$ to obtain a plurality of N successive samples $x_k$ with $k=0, 1, 2, \ldots N-1$;
- the number of samples N and the sampling interval $\Delta t$ are chosen so that the inverse of their product $N.\Delta t$ is at least approximately equal to 0.3 Hz;
- said sampled command is broken down into a Fourier series in such a way that each sample $x_k$ adopts the form:

$$x_k = \sum_{r=0}^{N-1} \frac{1}{N} A_r e^{\frac{2\pi j k r}{N}}$$

in which expression j is the symbol assigned to the imaginary part of a complex number, r is the number of harmonic components in the Fourier series and $A_r$ are the Fourier coefficients, each of the latter being equal to:

$$A_r = \sum_{k=0}^{N-1} x_k e^{\frac{-2\pi j k r}{N}}$$

- the moduli |A1| and |A2| of the first two Fourier coefficients A1 and A2, respectively corresponding to r=1 and r=2, are determined;
- an index I is calculated that is equal to the quotient of the sum |A1|+|A2| of said moduli by the number N of samples; and
- said index I is compared with a fraction $q.\delta o$ of said maximum value $\delta o$ of said electric command $\delta$ and it is reckoned:
  - that there are no pilot induced oscillations if said index I is lower than said fraction $q.\delta o$; and
  - that there are pilot induced oscillations if said index I is equal to or greater than said fraction $q.\delta o$, the value, lying between 0 and 1, of said index I being representative of the amplitude of said oscillations corresponding to said pilot induced oscillations.

The method of the present invention is based on two observations made by the Applicant Company when examining real earlier flight scenarios in which pilot induced oscillations had occurred:
- on the one hand, this examination showed that induced oscillations have frequencies of between 0.3 Hz and 0.6 Hz, which means that the purpose of breaking down the command into a Fourier series is to determine the components of this command that lie between 0.3 Hz and 0.6 Hz;
- on the other hand, said examination showed that, when said induced oscillations occur, their energy exceeds a certain fraction, generally at least approximately equal to 15%, of the maximum vale $\delta o$ of the command $\delta$. Hence, according to a particular feature of the present invention, said coefficient q of said fraction $q.\delta o$ is determined from a pre-established database grouping together a number of real earlier flight scenarios in which such pilot induced oscillations occurred.

As a preference, said electric command $\delta$ is filtered prior to sampling, in order to eliminate from it any oscillations other than those corresponding to pilot induced oscillations.

When the aircraft is designed to be able to be flown by a pilot and a copilot, it is advantageous for said electric command $\delta$ to be the sum of the corresponding individual electric commands resulting respectively from the action of the pilot and from the action of the copilot.

The present invention also relates to a device for implementing the abovementioned method. Such a device, allowing the detection of oscillations corresponding to pilot induced oscillations, in an electric command $\delta$ controlling an aircraft about one of its axes of maneuver, is notable in that it comprises:
- first means for sampling said electric command $\delta$;
- second means for breaking said sampled command $\delta$ down into a Fourier series;

third means for calculating said index I; and fourth means making the comparison between said index I and said fraction q.δo of said maximum value of said electric command δ.

As a preference, said first, second, third and fourth means consist of one and the same computer which, advantageously, may form part of the fly-by-wire computers of said aircraft.

The figures of the attached drawing will make it easy to understand how the invention can be embodied. In these figures, identical references denote elements which are similar.

Figure 2:
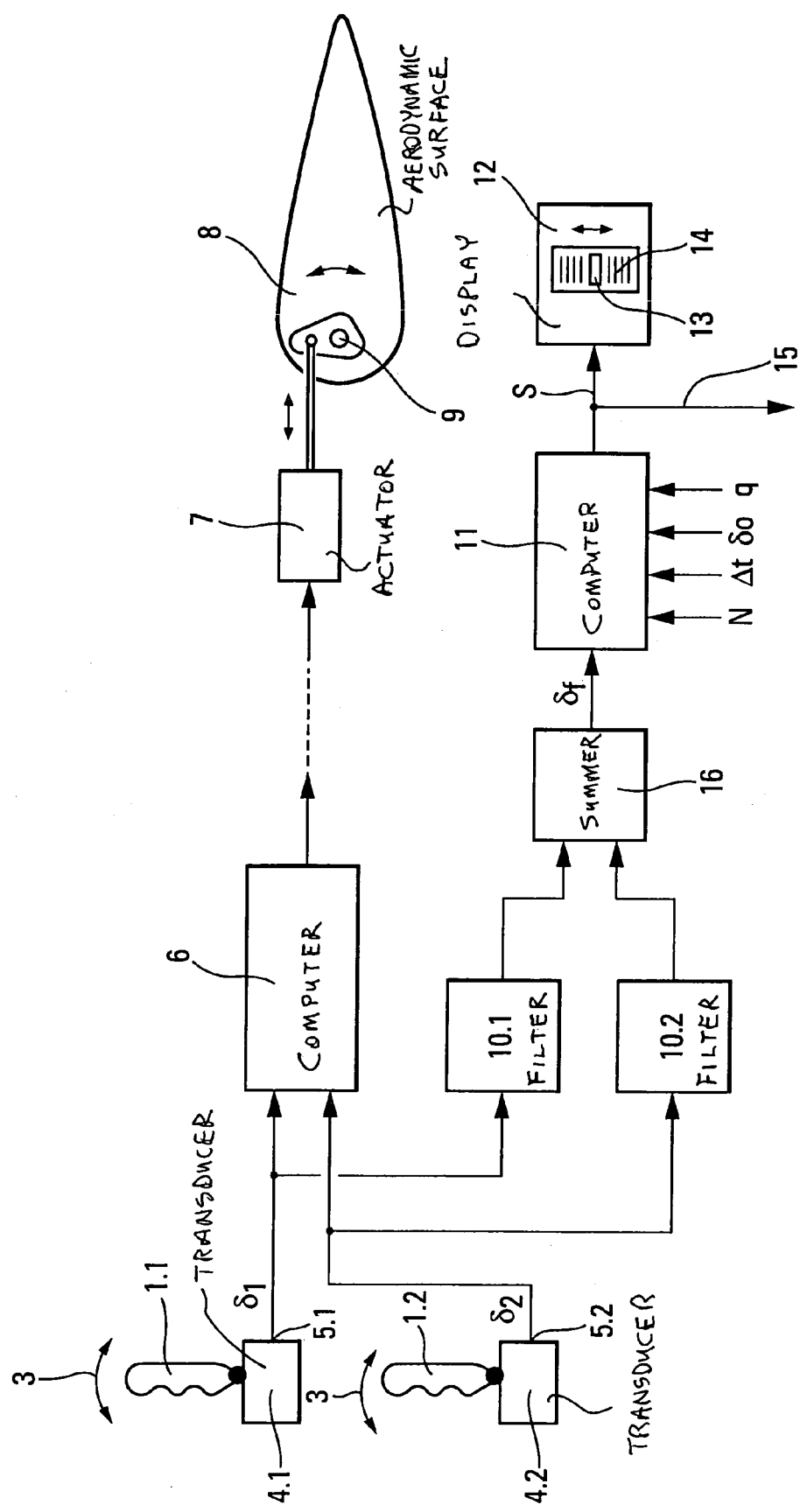
Figure 3:
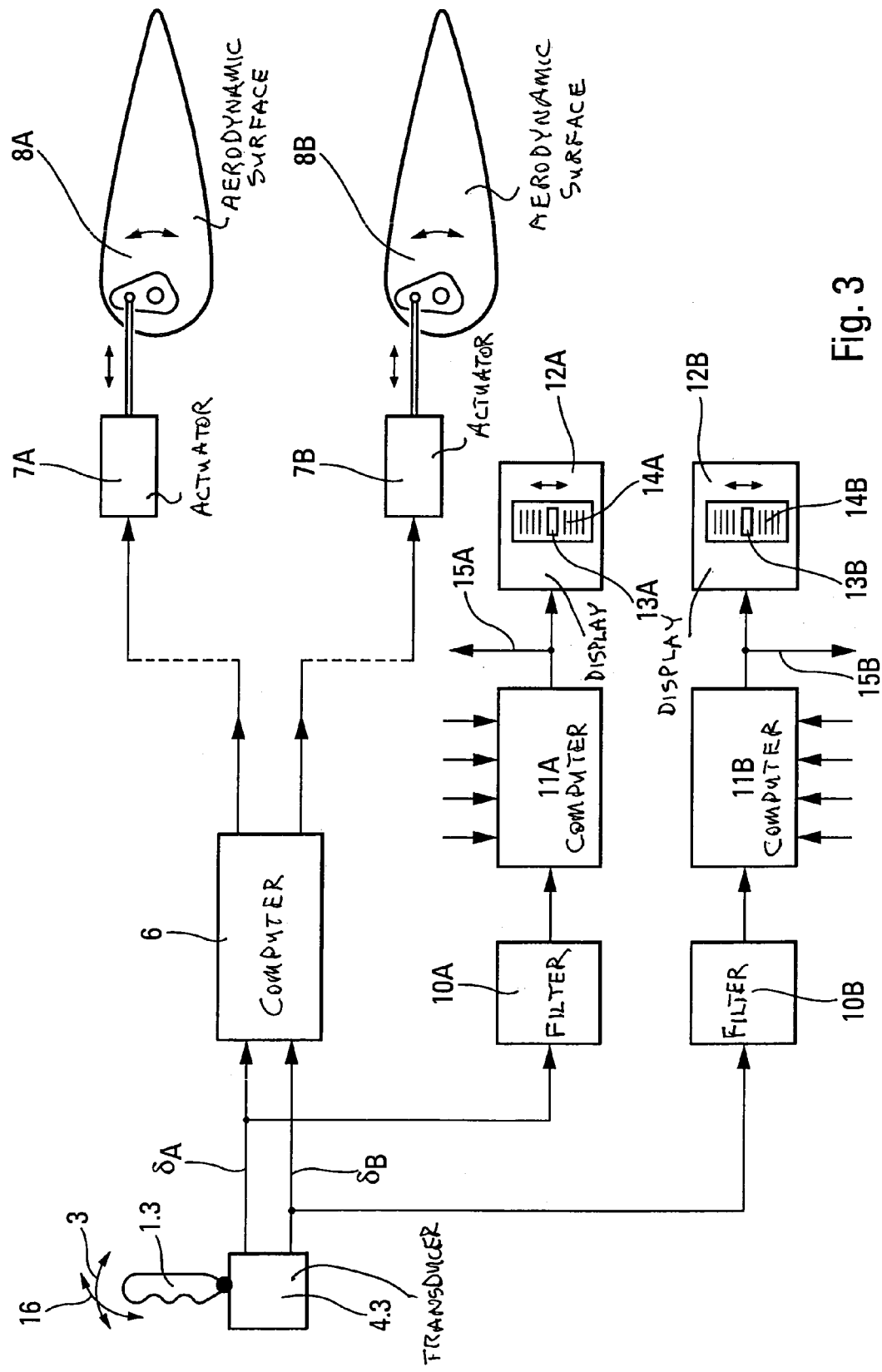

FIGS. 1 to 3 show block diagrams of three schematic embodiments of the invention.

The control system, depicted schematically in FIG. 1, comprises a control 1, for example of the stick type, which can tilt about an articulation 2 in two opposite directions (double-headed arrow 3). The control 1 is associated with a transducer 4 delivering, at its output 5, an electric command δ representative of the amplitude of the tiling of the control 1.

The electric command δ is transmitted to fly-by-wire computers 6 which generate an order for the actuators 7, able to turn moving aerodynamic surfaces 8 of an aircraft (not depicted) about their axis of rotation 9. If the control 1 is a stick, for example a ministick, the moving aerodynamic surfaces 8 control said aircraft either in terms of roll or in terms of pitch.

Furthermore, the command δ, in which frequencies lying between 0.3 and 0.6 Hz, representative of any possible pilot induced oscillation induced by the pilot operating said control 1, are sought, is sent to a filtering system 10 able to eliminate from this command δ any oscillations that do not correspond to said induced oscillations. Thereafter, the filtered command δf is sent to a computer 11, able to break it down into a Fourier series, so as to detect therein any components having frequencies lying between 0.3 and 0.6 Hz.

To allow such a breakdown into a Fourier series, it is absolutely essential for said command δ to be stored temporarily. For this, the computer 11 begins by sampling the command δ at a sampling interval Δt to obtain N successive samples $x_k$ with k=0, 1, 2, ... N−1. Thus, the continuous command δ is converted into a discrete signal $x_k$.

The number N and the interval Δt are chosen, among other technical considerations, so that the inverse of their product is at least practically equal to 0.3 Hz. For example, in practice, Δt may be taken as 125 ms with N=27. Thus, the product N.Δt is equal to 3.375 s and its inverse 1/N.Δt is equal to 0.296 Hz.

The discrete signal $x_k$ is then broken down into a Fourier series by the computer 11 so that, regardless of the value of k between 0 and N−1, the following hold true, in a known way:

$$x_k = \sum_{r=0}^{N-1} \frac{1}{N} A_r e^{\frac{2\pi j k r}{N}} \text{ with } A_r = \sum_{k=0}^{N-1} x_k e^{\frac{-2\pi j k r}{N}}$$

In these expressions:

j is the symbol (equal to $\sqrt{-1}$) assigned to the imaginary part of a complex number;

r is the number of harmonic components in the Fourier series; and

Ar are the Fourier coefficients of said breakdown.

Thus, the coefficients Ar constitute a periodic signal which is periodic in terms of frequency, with a period 1/Δt, sampled at the frequency Δf=1/N.Δt.

Such a breakdown into a Fourier series therefore provides the frequency-based analysis of the signal $x_k$ on a horizon N.Δt with a resolution Δf=1/N.Δt.

Furthermore, in a known way, the moduli |Ar| of the Fourier coefficients Ar, for which r is other than 0, measure the energy of the signal $X_k$ at the frequency r.Δf.

Now, in this instance, Δf is close to 0.3 Hz, which means that r.Δf is also close to 0.3 Hz for r=1, corresponding to the first Fourier coefficient A1, and close to 0.6 Hz for r=2, corresponding to the second Fourier coefficient A2.

The sum |A1|+|A2| of the moduli |A1| and |A2| of said first and second Fourier coefficients A1 and A2 therefore represents the energy of the signal $x_k$ for frequencies lying between 0.3 Hz and 0.6 Hz and corresponding to the pilot induced oscillations.

The computer 11 therefore calculates said sum of the moduli |A1|+|A2|, which is consistent with the amplitude of the command δ give or take the factor N.

In consequence, in order to determine whether there is any pilot induced oscillation in the command δ, the energy of the looked-for sinusoidal signal, that is to say the sum |A1|+|A2|, can be compared with the maximum value δo of said command δ.

To do this, the computer 11 calculates an index I equal to the quotient (|A1|+|A2|)/N and compares this index with a predetermined fraction q.δo of this maximum value δo.

The coefficient q of this fraction q.δo is, for example, determined from a database grouping together a number of earlier known flight scenarios in which pilot induced oscillations occurred onboard aircraft. This coefficient is generally close to 0.15.

Hence, the computer 11 is able to generate a signal S which is:

equal to 0 when said index I is lower than q.δo, because then there is no pilot induced oscillation; and equal to (|A1|+|A2|)/N, lying between 0 and 1, when said index I is equal to or greater than q.δo and there is then some pilot induced oscillation.

As mentioned hereinabove, the index I is consistent with the amplitude of the command δ, in the frequency range 0.3 Hz–0.6 Hz. This amplitude has a maximum value δo when the command contains only frequencies lying within that range. Thus, according to the invention, pilot induced oscillation is deemed to have been detected if the amplitude of the command δ, in said frequency range 0.3 Hz–0.6 Hz, exceeds q % of the maximum amplitude δo.

The signal S may be transmitted to a display device 12, for example provided with a pointer 13 associated with a scale 14, the relative position of said pointer with respect to said scale being representative of the amplitude of said signal S and therefore of the existence and amplitude of any such induced oscillations corresponding to pilot induced oscillations.

Furthermore, said signal S is available on a line 15, for any worthwhile use.

In order to break the discrete signal $x_k$ down into a Fourier series, the computer 11 may employ algorithms known by the name of "Fast Fourier Transforms" or any other known method, such as a recurrent method for example.

FIG. 2 schematically illustrates the case where the control system comprises two controls 1.1 and 1.2 in parallel, respectively similar to control 1 and intended for a pilot and for a copilot. In this case, the respective transducers 4.1 and 4.2 (similar to the transducer 4) are able to deliver, on their output 5.1 or 5.2, individual commands 61 and 62 originating respectively from the action of the pilot and that of the copilot. These individual commands 61 and 62 are sent to the fly-by-wire computers 6 which process them to control the moving aerodynamic surfaces 8.

Furthermore, according to the present invention, the individual commands δ1 and δ2 are sent to filters 10.1 and 10.2 (similar to the filter 10) and summed in a summer 16, before being transmitted to the computer 11. In this case, the filtered command δf sent to the computer 11 for similar processing to the processing described hereinabove, is therefore the filtered sum of the two individual commands δ1 and δ2.

In the control system depicted schematically in FIG. 3, the control 1.3 tilts not only in the two opposite directions of the arrow 3, but also in two opposite directions (see the double-headed arrow 17) directed at right angles to the first ones, which means that the associated transducer 4.3 can deliver two electric commands δA and δB. One of these may, for example, be intended for control in roll and the other for control in pitch. The fly-by-wire computers 6 which receive the commands δA and δB generate respective orders for actuators 7A and 7B, tasked with actuating moving aerodynamic surfaces 8A and 8B which themselves allow the aircraft to be flown about the corresponding axis of maneuver (roll axis and pitch axis, for example).

Furthermore, according to the present invention, each command δA and δB is processed in a similar way to the signal δ of the system of FIG. 1, that is to say that it is filtered by a filter 10A or 10B (similar to the filter 10) then processed by a computer 11A or 11B (similar to the computer 11), the result of said processing being displayed on a display device 12A or 12B (similar to the display device 12) comprising a pointer 13A or 13B and a scale 14A or 14B and/or available on lines 15A or 15B (similar to said line 15).

It will be readily understood that it may be advantageous for the computers 11, 11A and 11B to form part of the fly-by-wire computers 6 even though, in the drawings, they are depicted as distinct from the latter.

Furthermore, by association of FIGS. 2 and 3, it is easy to construct an embodiment provided with two controls, each of which is able to fly the aircraft about two axes of maneuver.

The invention claimed is:

1. In an aircraft having:
    at least one tilting control that controls said aircraft about at least one of its axes of maneuver; and
    a means operated by a pilot for generating an electric command δ, representative of the amplitude of the tilting of said at least one tilting control, said electric command δ being able to adopt a maximum value δo, a method for detecting pilot induced oscillations in said electric command δ comprising:
    sampling said electric command δ at a sampling interval Δt to obtain a plurality of N successive samples $X_k$ with k=0, 1, 2, ..., N−1 ;
    choosing the number of samples N and the sampling interval Δt so that the inverse of their product N.Δt is at least approximately equal to 0.3 Hz;
    breaking down said sampled command into a Fourier series in such a way that each sample $x_k$ adopts the form:

$$x_k = \sum_{r=0}^{N-1} \frac{1}{N} A_r e^{\frac{2\pi j k r}{N}}$$

in which expression j is the symbol assigned to the imaginary part of a complex number, r is the number of harmonic components in the Fourier series and $A_r$ are the Fourier coefficients, each of the latter being equal to:

$$A_r = \sum_{k=0}^{N-1} x_k e^{\frac{-2\pi j k r}{N}}$$

determining the moduli |A1| and |A2| of the first two Fourier coefficients A1 and A2, respectively corresponding to r=1 and r=2;
   calculating the sum |A1|+|A2| of said moduli, said sum being representative of the energy of said signal samples $X_k$ for frequencies lying between 0.3 Hz and 0.6 Hz and corresponding to the pilot induced oscillations;
   calculating an index I that is equal to the quotient of the sum |A1|+|A2| of said moduli divided by the number N of samples;
   comparing said index I with a fraction q.δo of said maximum value δo of said electric command δ, said coefficient q of said fraction q.δo being determined from a pre-established database grouping together a number of earlier flight scenarios in which such pilot induced oscillations occurred; and
   generating a signal that is:
       equal to zero when said index I is lower than q.δo, because then there is no pilot induced oscillation; and
       equal to a value lying between 0 and 1, when said index I is equal to or greater than q.δo, because then there is some pilot induced oscillation, said value being representative of the amplitude of said pilot induced oscillations.

2. A device for implementing the method as claimed in claim 1, allowing the detection of oscillations corresponding to pilot induced oscillations, in an electric command δ controlling an aircraft about one of its axes of maneuver, and which comprises:
   a first section that samples said electric command δ;
   a second section that breaks said sampled command δ down into a Fourier series;
   a third section that calculates said index I; and
   a fourth section that makes the comparison between said index I and said fraction q.δo of said maximum value of said electric command δ.

3. The device as claimed in claim 2, wherein said first, second, third and fourth sections consist of one and the same computer.

4. The device as claimed in claim 2, wherein said computer forms part of the fly-by-wire computers with which said aircraft is equipped.

5. The method as claimed in claim 1, wherein said coefficient q of the fraction q.δo is at least approximately equal to 0.15.

6. The method as claimed in claim 1, wherein said electric command δ is filtered prior to sampling, in order to eliminate from it any oscillations other than those corresponding to pilot induced oscillations.

7. The method as claimed in claim 1 for an aircraft that can be flown by a pilot and/or a copilot, wherein said electric command δ is the sum of the corresponding individual electric commands $\delta_1$ and $\delta_2$ resulting respectively from the action of the pilot and from the action of the copilot.

8. A device for implementing the method as claimed in claim 1, allowing the detection of oscillations corresponding to pilot induced oscillations, in an electric command $\delta$ controlling an aircraft about one of its axes of maneuver, and which comprises:
    a first means for sampling said electric command $\delta$;
    second means for breaking said sampled command $\delta$ down into a Fourier series;
    third means for calculating said index I; and
    fourth means making the comparison between said index I and said fraction $q.\delta o$ of said maximum value of said electric command $\delta$.

9. The device as claimed in claim 8, wherein said first, second, third and fourth means consist of one and the same computer.

10. The device as claimed in claim 9, wherein said computer forms part of the fly-by-wire computers with which said aircraft is equipped.

* * * * *